(12) United States Patent  
Sakuma

(10) Patent No.: US 10,757,296 B2  
(45) Date of Patent: Aug. 25, 2020

(54) IMAGE READING DEVICE, IMAGE GENERATING DEVICE, AND RECORDING MEDIUM

(71) Applicant: Konica Minolta, Inc., Chiyoda-ku, Tokyo (JP)

(72) Inventor: Keishi Sakuma, Hachioji (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/273,314

(22) Filed: Feb. 12, 2019

(65) Prior Publication Data

US 2019/0289167 A1 Sep. 19, 2019

(30) Foreign Application Priority Data

Mar. 14, 2018 (JP) .................................. 2018-046132

(51) Int. Cl.
*H04N 1/401* (2006.01)
*H04N 1/19* (2006.01)
(Continued)

(52) U.S. Cl.
CPC ........... *H04N 1/401* (2013.01); *H04N 1/0005* (2013.01); *H04N 1/00013* (2013.01); *H04N 1/00811* (2013.01); *H04N 1/00819* (2013.01); *H04N 1/00822* (2013.01); *H04N 1/00936* (2013.01); *H04N 1/19* (2013.01); *H04N 1/407* (2013.01)

(58) Field of Classification Search
CPC ................................................. H04N 1/00819
See application file for complete search history.

(56) References Cited

U.S. PATENT DOCUMENTS

| 6,084,692 A * | 7/2000 | Ohtani | ............... | H04N 1/00795 358/505 |
| 2008/0180761 A1* | 7/2008 | Sato | ................... | H04N 1/00795 358/497 |

(Continued)

FOREIGN PATENT DOCUMENTS

| JP | 2010-232880 | 10/2010 |
| JP | 2014-197778 | 10/2014 |

OTHER PUBLICATIONS

European Search Report issued in corresponding EP Application No. 19161003.9 dated Aug. 21, 2019.

*Primary Examiner* — King Y Poon
(74) *Attorney, Agent, or Firm* — BakerHostetler

(57) ABSTRACT

The present disclosure pertains to an image reading device that may include an image reader, an operation detector, a correction parameter adjuster, an entry detector, and a document reading controller. The image reader may read an image on a document. The operation detector may detect an operation indicating a start of a reading of the image on the document. The correction parameter adjuster may perform adjustment of a correction parameter. The entry detector may detect entry of a document reading instruction including a reading condition. The document reading controller may check for completion of the adjustment of the correction parameter for the reading condition. If the adjustment of the correction parameter is not completed, the document reading controller may instruct the correction parameter adjuster to perform adjustment of an uncompleted correction parameter and instruct the image reader to read the image.

12 Claims, 7 Drawing Sheets

(51) Int. Cl.
*H04N 1/00* (2006.01)
*H04N 1/407* (2006.01)

(56) References Cited

U.S. PATENT DOCUMENTS

| | | | |
|---|---|---|---|
| 2009/0168092 A1* | 7/2009 | Chen | G06F 9/5027 |
| | | | 358/1.15 |
| 2010/0302605 A1* | 12/2010 | Suzuki | H04N 1/00002 |
| | | | 358/474 |
| 2017/0041492 A1 | 2/2017 | Morie | |

* cited by examiner

IMAGE READING DEVICE, IMAGE GENERATING DEVICE, AND RECORDING MEDIUM

BACKGROUND

1. Technological Field

The present disclosure relates to an image reading device, an image generating device, and a recording medium.

2. Discussion of Technical Background

Image reading devices are known that convert analog signals from imaging elements, such as charge coupled devices (CCD) and contact image sensors (CIS), into digital signals through analog front-ends (AFE) and generate digital image data from the digital signals. Typical image reading devices are independent devices or are mounted in image generating devices, such as multifunction peripherals (MEPs) and complex machines.

The image reading devices generally requires adjustments, such as input signal offsetting, gain adjustment, and retrieval of white reference data in the AFEs, in order to correct the gradation of an image for each reading condition before reading of the image of a document. These adjustments require several seconds depending on the configuration of the image reading device. After reception of an instruction to start reading of a document (document reading instruction) from a user, the adjustments are performed. In this case, it takes a little time before the actual reading of the document starts.

Thus, an image reading device disclosed in Japanese Unexamined Patent Application Publication No. 2014-197778 only offsets the input signal in the AFE, which is common in every reading condition, after the start of reading of a document and subsequently receives the determined reading condition from an external device. The image reading device performs other processes requiring different control procedures depending on reading conditions after reception of the determined reading condition.

Another image reading device disclosed in Japanese Unexamined Patent Application Publication No. 2010-232880 receives an document reading instruction from an external device and subsequently retrieves light intensity data for a color mode or monochrome mode. The image reading device then receives a signal indicating a reading condition from an operational instruction receiver, calculates and determines one or more correction parameters based on the light intensity data for the mode designated by the reading conditions to start reading of the document.

However, the image reading device disclosed in Japanese Unexamined Patent Application Publication No. 2014-197778 can only reduce the time for the common procedure in every reading condition or the offsetting of the input signal. The image reading device disclosed in Japanese Unexamined Patent Application Publication No. 2010-232880 is not configured to start reading of the document in response to transmitted signals indicating reading conditions during the retrieval of the light intensity data for multiple reading conditions. The signal instructing the start of document reading is transmitted by a user operation and the light intensity data for each reading condition is subsequently retrieved. Thus, a certain period of time is required between the reception of the document reading instruction and the start of the document reading.

The following control may also be available; the adjustments for reading conditions are completed before the reception of the document reading instruction, and then, the document reading instruction is transmitted. After the reading conditions are determined, the results of the adjustments corresponding to the determined reading conditions are used for reading of the document. A large number of reading conditions, however, requires a long time for the preliminary adjustments of the reading conditions. The document reading instruction transmitted during the adjustments can be performed only after the completion of the adjustments. Thus, the required time cannot be reduced in some cases. Hence, the time between the transmission of the document reading instruction and the start of the document reading must be further reduced.

SUMMARY

An object of the present disclosure may be to reduce a time between a transmission of a document reading instruction and a start of the document reading.

To achieve at least one of the abovementioned objects, according to a first aspect of the present disclosure, an image reading device includes: an image reader that reads an image on a document; and a hardware processor, wherein the hardware processor detects an operation indicating start of reading the image on the document, the hardware processor performs adjustment of a correction parameter including retrieval of light intensity data and calculation of a correction parameter based on the retrieved light intensity data after the operation indicating the start of reading the image is detected, the retrieval and the calculation being performed for all of a reading condition for the image reader, the hardware processor detects entry of a document reading instruction including the reading condition determined for the image reader, the hardware processor checks for completion of the adjustment of the correction parameter for the determined reading condition included in the document reading instruction after the hardware processor detects the entry of the document reading instruction, if the adjustment of the correction parameter is completed, the hardware processor instructs the image reader to read the image using the correction parameter for the determined reading condition, and if the adjustment of the correction parameter is not completed, the hardware processor performs the adjustment of an uncompleted correction parameter and instructs the image reader to read the image using the correction parameter for the determined reading condition.

According to a second aspect of the present disclosure, a computer readable recording medium stores a program that causes a computer to serve as: an image reader that reads an image on a document; and a hardware processor, wherein the hardware processor detects an operation indicating start of reading the image on the document, the hardware processor performs adjustment of a correction parameter including retrieval of light intensity data and calculation of a correction parameter based on the retrieved light intensity data after the operation indicating the start of reading the image is detected, the retrieval and the calculation being performed for all of a reading condition for the image reader, the hardware processor detects entry of a document reading instruction including the reading condition determined for the image reader, the hardware processor checks for completion of the adjustment of the correction parameter for the determined reading condition included in the document reading instruction after the hardware processor detects the entry of the document reading instruction, if the adjustment of the correction parameter is completed, the hardware processor instructs the image reader to read the image using the correction parameter for the determined reading condition, and if the adjustment of the correction parameter is not completed, the hardware processor performs the adjustment of an uncompleted correction parameter and instructs the image reader to read the image using the correction parameter for the determined reading condition.

BRIEF DESCRIPTION OF THE DRAWINGS

The advantages and features provided by one or more embodiments of the disclosure will become more fully understood from the detailed description given hereinbelow and the appended drawings which are given by way of illustration only, and thus are not intended as a definition of the limits of the present disclosure.

DETAILED DESCRIPTION OF EMBODIMENTS

Hereinafter, one or more embodiments of the present disclosure will be described with reference to the drawings. However, the scope of the invention is not limited to the disclosed embodiments.

With reference to the accompanying drawings, an embodiment according to the present disclosure and first and second modifications of the embodiment will now be described in detail.

Embodiment

Figure 1:
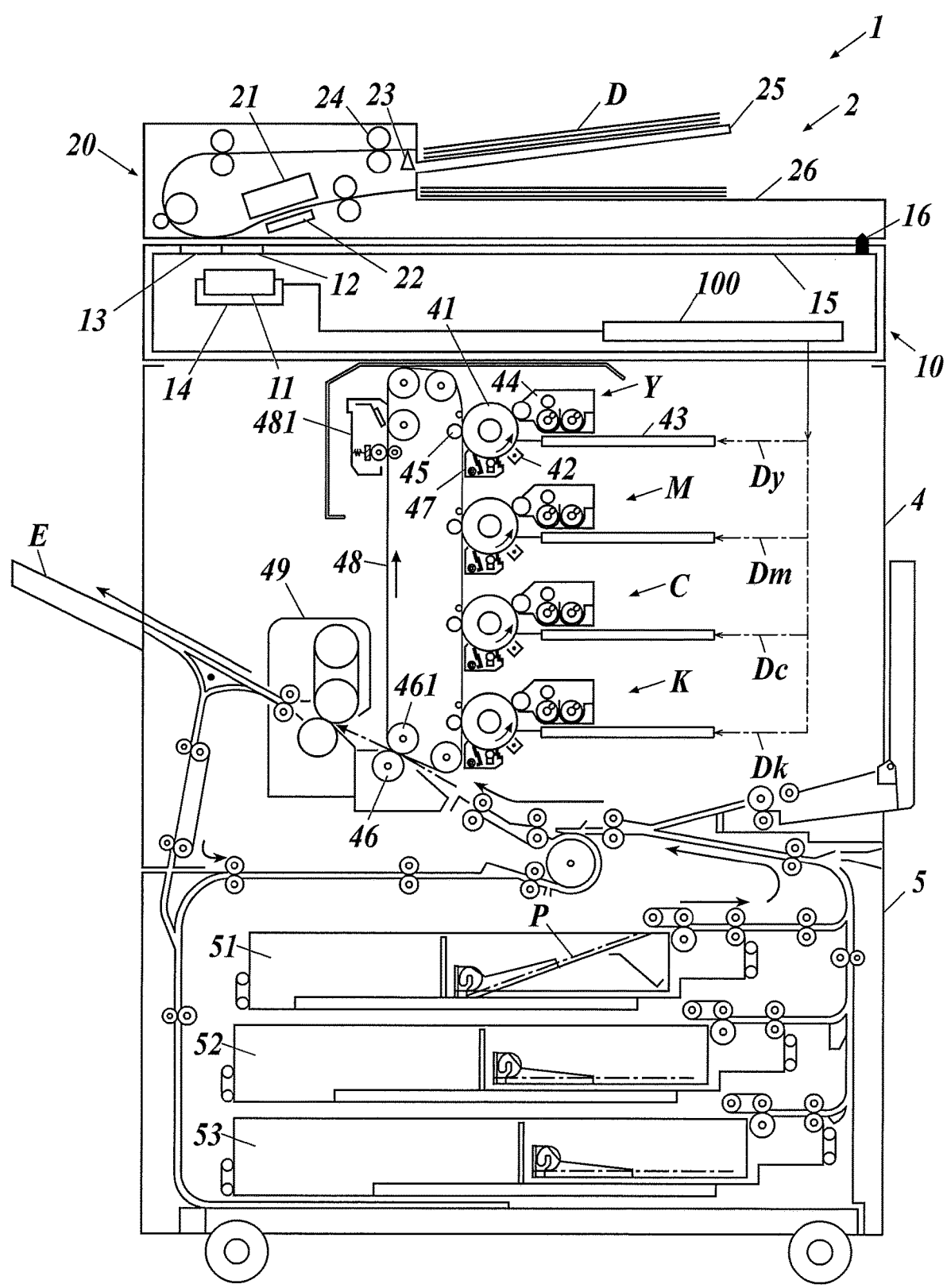
FIG. 1 illustrates a schematic configuration of an image generating device according to an embodiment of the present disclosure.
Figure 2:
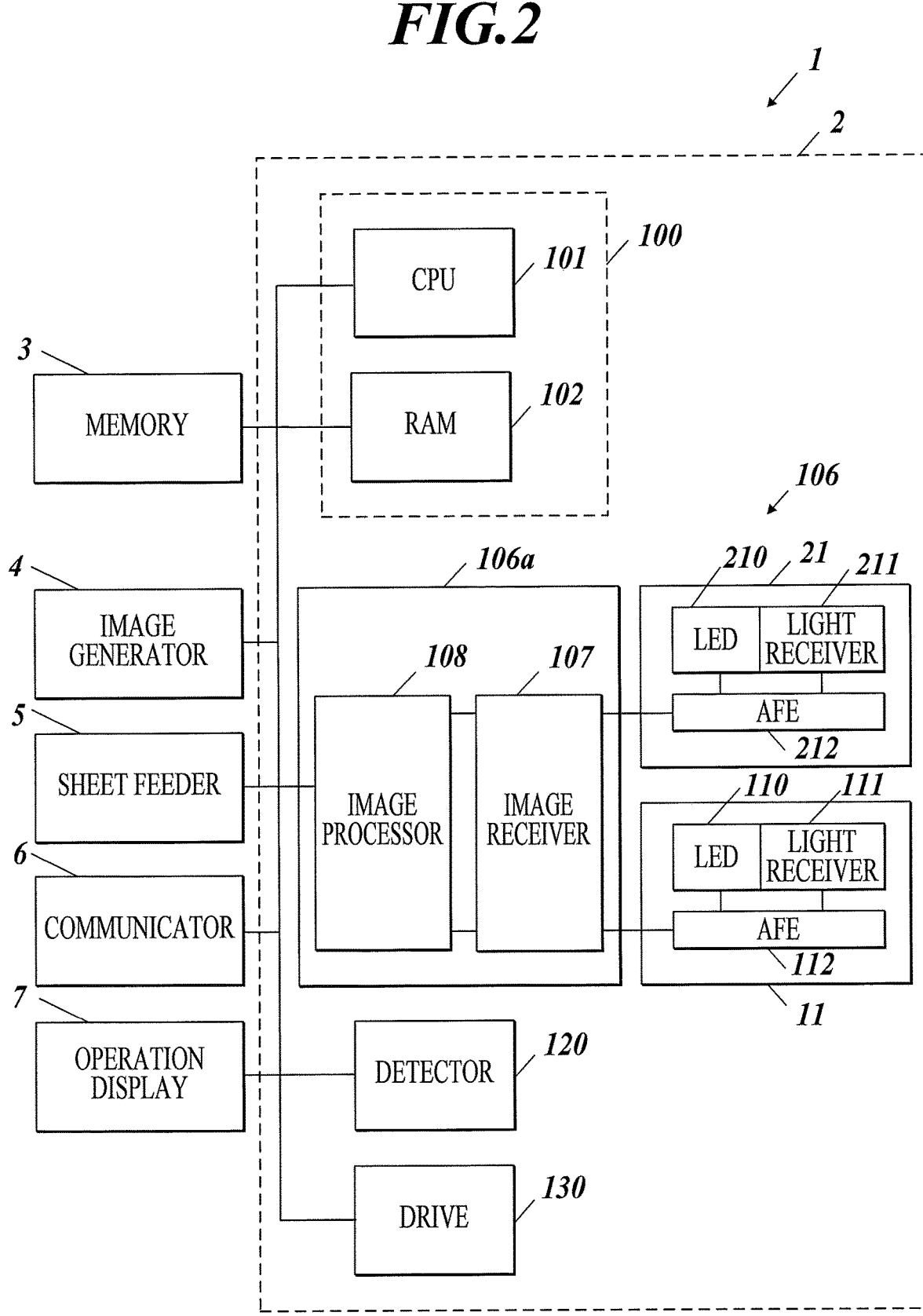
FIG. 2 is a block diagram of a functional configuration of the image generating device.

With reference to FIGS. 1 to 5, an embodiment according to the present disclosure will now be described. With reference to FIGS. 1 and 2, the configuration of a device according to this embodiment will be described. FIG. 1 illustrates a schematic configuration of an image generating device 1 according to the embodiment. FIG. 2 is a block diagram of a functional configuration of the image generating device 1.

The image generating device 1 according to the present embodiment is a multifunction peripheral reading an image of a document and generating the image on a sheet in accordance with an electrophotographic printing scheme. As illustrated in FIG. 1, the image generating device 1 includes an image reader 2, an image generator 4, and a sheet feeder 5.

As illustrated in FIG. 1, the image reader 2 includes a flatbed (FB) 10, an automatic document feeder (ADF) 20, and a hardware processor 100. The FB 10 reads the image of a document placed on the image reader 2 or the image of a document D transferred from the ADF 20. The ADF 20 is mounted on the FB 10, is openable and automatically transfers the document D to the FB 10. The hardware processor 100 may be disposed within the image generator 4 of the image generating device 1.

The FB 10 includes an image sensor module 11, a white reference plate 12, an ADF window 13, a slider 14, a FB glass 15, and an opening detector 16. The image sensor module 11 reads the image of the document placed on the image reader 2 or the image of the document D transferred from the ADF 20 and transmits the image data of the read document to the hardware processor 100. The white reference plate 12 is fixed opposite the image sensor module 11 and serves as a calibration reference for white or black data acquired by the image sensor module 11. The ADF window 13 is, for example, a contact glass enabling the image sensor module 11 to read the document D from the ADF 20. FB glass 15 is a platen supporting the document. The image sensor module 11 is attached to the slider 14. The slider 14 serves as a horizontally movable drive. The image sensor module 11 can read the image of the document on the FB glass 15 through the movement of the slider 14.

For reading of the document with the FB 10, a user opens the ADF 20 of the image generating device 1 to place the document on the FB glass 15 and then closes the ADF 20. The opening detector 16 senses the opening of the ADF 20.

The ADF 20 includes an image sensor module 21, a white reference plate 22, a document detector 23, a conveyor 24, a document table 25, and a document discharger 26. The image sensor module 21 reads the image on the reverse face of the document D from the document table 25 and transmits the data of the read image to the hardware processor 100.

The white reference plate 22 is fixed opposite the image sensor module 21. The document detector 23 senses the document D placed on the document table 25. The conveyor 24 is a drive, for example, a conveying roller that transfers the document D from the document table 25 to the document discharger 26. The document table 25 receives the document D before reading of the image. The document discharger 26 discharges the document D after the image reading. The hardware processor 100 controls individual components of the image generating device 1.

The image generator 4 includes a yellow imager Y, a magenta imager M, a cyan imager C, a black imager K, an intermediate transfer belt 48, a cleaner 481, a secondary transfer belt 46, a secondary opposite transfer roller 461, and a fixer 49. The imagers Y, M, C, and K respectively generate yellow, magenta, cyan, and black toner images and primarily transfers the generated Y, M, C, and K toner images to the intermediate transfer belt 48.

The imagers Y, M, C, and K each include a photoreceptor 41, a charger 42, an exposer 43, a developer 44, a primary transfer roller 45, and a cleaner 47. The imagers Y, M, C, and K have the same configuration and operate in the same manner. In the following description, the configuration of the components of the image generator 4 is exemplified by the yellow imager Y.

The photoreceptor 41 includes an organic photoreceptor having a light-sensitive layer composed of a resin containing an organic photoconductor in the outer circumference of a cylindrical metal substrate and is driven or rotated in the direction of the arrow in the drawing. The photoreceptor 41 has a layer structure including, in sequence, a conductive pipe, such as aluminum pipe, an undercoat layer (UCL), a charge generation layer (CGL), and a charge transport layer (CU).

The charger 42 electrically charges the surface of the photoreceptor 41 with a negative polarity at a predetermined potential. The exposer 43 exposes the non-image area of the photoreceptor 41 to exposure light based on the image data Dy from the hardware processor 100 and removes the electric charge in the exposed portion of the photoreceptor 41 to generate an electrostatic latent image on the image area of the photoreceptor 41. Specifically, the surface of the photoreceptor 41 is charged into a negative polarity with the charger 42. The surface is exposed to exposure light by the exposer 43, and the electric charge on the surface is thereby eliminated. Both positive and negative electric charges are then generated in the charge generation material (CGM) of the CGL. The positive electric charge in the hole passes through the CTL to the surface of the photoreceptor 41, and the negative electric charge passes through the UCL to the pipe. An electrostatic latent image is thereby generated on the photoreceptor 41.

The developer 44 includes a development sleeve which faces the photoreceptor 41 across a development area. The development sleeve receives a developing bias voltage generated from an alternating voltage superimposed on a direct voltage having, for example, a polarity same as the charging polarity of the charger 42, in other words, the negative polarity. The developer 44 supplies developing particles to the electrostatic latent image on the photoreceptor 41 so as to generate a yellow toner image. The developing particles contain toners and carriers electrically charging the toners.

The primary transfer roller 45 primarily transfers the yellow toner image on the photoreceptor 41 to the intermediate transfer belt 48. It should be noted that the other imagers M, C, and K primarily transfer the magenta, cyan, and black toner images, respectively, to the intermediate transfer belt 48 in the same manner. Thus, the Y, M, C, and K toner images are generated on the intermediate transfer belt 48.

The cleaner 47 removes or surpluses the toners that are not transferred onto the intermediate transfer belt 48 in the primary transfer area and thus remain on the photoreceptor 41. After removal of the toners with the cleaner 47, the photoreceptor 41 is electrically recharged by the charger 42, and the generation of another electrostatic latent image and the transfer of the corresponding toner image are repeated.

The intermediate transfer belt 48 is a semiconductive endless belt that is disposed over and supported by multiple rollers. The intermediate transfer belt 48 is driven to circulate in the direction of the arrow in the drawing in cooperation with the rotations of the rollers. The intermediate transfer belt 48 is biased to the photoreceptors 41 by the primary transfer roller 45, through which transfer current corresponding to the applied voltage passes. Thus, toner images generated on the photoreceptor 41 are primarily transferred to the intermediate transfer belt by the primary transfer roller 45 in sequence.

The secondary transfer belt 46 is biased to the intermediate transfer belt 48 and is driven. The Y, M, C, and K toner images generated on the intermediate transfer belt 48 are secondarily transferred onto a sheet P fed from the sheet feeder 5. In detail, the secondary transfer belt 46 comes into contact with the secondary transfer roller 461 with the intermediate transfer belt 48 disposed therebetween. The secondary transfer belt 46 and the secondary opposite transfer roller 461 define a transfer nip. The sheet P passes through the nip. Thus, the toner image on the intermediate transfer belt 48 is secondarily transferred to the sheet P.

The cleaner 481 removes or surpluses the toners that are not transferred onto the sheet P and thus remain on the intermediate transfer belt 48.

The fixer 49 includes a heating roller and a pressing roller. The sheet P with the secondarily transferred Y, M, C, and K toner images passes through a nip between the heating roller and the pressing roller and is thereby heated and pressed, so that the toner images are fixed on the sheet P. After the toner images are fixed, the sheet P is discharged onto a catch tray E. Alternatively, after the toner images are fixed, the sheet P is reversed by a reversion mechanism and transferred to a transfer nip in the image generator 4.

The sheet feeder 5 includes three sheet feeding trays 51, 52, and 53 and accommodates different types of sheets P in the sheet feeding trays 51, 52, 53, respectively. The sheet feeder 5 transfers a selected accommodated sheet P to the image generator 4 through a predetermined path.

With reference to FIG. 2, the functional configuration of the image generating device 1 will now be described. The image generating device 1 includes an image reader 2, a memory 3, an image generator 4 as image generating means, a sheet feeder 5, a communicator 6, an operation display 7 as operating means. The image reader 2 includes means for detecting an operation indicating the start of document reading, means for adjusting a correction parameter, means for detecting a document reading instruction, means for controlling document reading, a hardware processor 100 as means for determining a predefined time, an image reading component 106 as means for reading an image, a detector 120, and a drive 130.

The hardware processor 100 controls components of the image generating device 1. The hardware processor 100 includes a central processing unit (CPU) 101 and a random access memory (RAM) 102. The CPU 101 is a circuit that controls the components of the image generating device 1. In the hardware processor 100, the CPU 101 reads various programs from the memory 3 to load the programs in the RAM 102 and performs various processes in cooperation with the loaded programs. In this manner, the hardware processor 100 performs a first image reading process and an image generation process, which will be described below.

The memory 3 is a non-volatile memory including, for example, a hard disk drive (HDD) and a semiconductor memory and storing various programs and data in a readable or writable manner. The memory 3 can store the image data read by the image reader 2.

In response to an instruction from the hardware processor 100, the image generator 4, for example, generates and fixes a toner image on a sheet based on the image data from a document read by the image reader 2, the image data received from an external device via the communicator 6, or the image data stored in the memory 3, and discharge the sheet to the catch tray E.

In response to an instruction from the hardware processor 100, the sheet feeder 5, for example, transfers a designated sheet from the sheet feeding trays 51, 52, and 53 to the image generator 4.

The communicator 6 includes, for example, a network card in accordance with a predetermined network scheme and is connected to a communication network, such as a local area network (LAN), to transmit and receive data to and from any device, for example, a PC in the communication network. In other words, the hardware processor 100 can communicate with the device in the communication network via the communicator 6.

The operation display 7 is, for example, a liquid crystal display (LCD) or an electroluminescent (EL) display and includes an operation interface, such as a touch panel. The operation display 7 displays various data transmitted from the hardware processor 100 and receives entry through a touch operation on the operation interface by a user to transmit the operational data to the hardware processor 100.

The image reader 2 includes the hardware processor 100, the image reading component 106, the detector 120, and the drive 130. The image reading component 106 includes an image reading hardware processor 106a and image sensor modules 11 and 21.

The image reading hardware processor 106a includes an image receiver 107 and an image processor 108. In response to an instruction from the hardware processor 100, the image receiver 107 receives data of images read by the image sensor modules 11 and 21. In response to an instruction from the hardware processor 100, the image processor 108 performs various imaging processes on the image data from the image receiver 107.

The image sensor module 11 includes a light emitting diode (LED) 110, a light receiver 111, and an AFE 112. LED 110 is a light source emitting a light beam toward the document D transferred from the ADF 20 or the document placed on the FB glass 15. The light receiver 111 stores the light beam emitted from the LED 110 and reflected from the document D to read the image on the document D and converts the data of the read image into analog electric signals. The AFE 112 converts the analog electric signals from the light receiver 111 into digital image signals or image data and transmits the signals. The image receiver 107 receives the digital image signals from the AFE 112. The signals indicate the image data of the document D from the ADF 20 or the image data of the document placed on the FB glass 15.

The image sensor module 21 includes a LED 210, a light receiver 211, and an AFE 212. Like the LED 110, the light receiver 111, and the AFE 112, the LED 210, the light receiver 211, and the AFE 212 generate an image on the reverse face of the document D transferred from the ADF 20 in cooperation.

The detector 120 includes, for example, the opening detector 16 of the FB 10 and the document detector 23 of the ADF 20 and transmits the information detected by the sensors to the hardware processor 100. The drive 130 includes, for example, the slider 14 of the FB 10 and the conveyor 24 of the ADF 20, which are driven in response to an instruction from the hardware processor 100.

Figure 3:
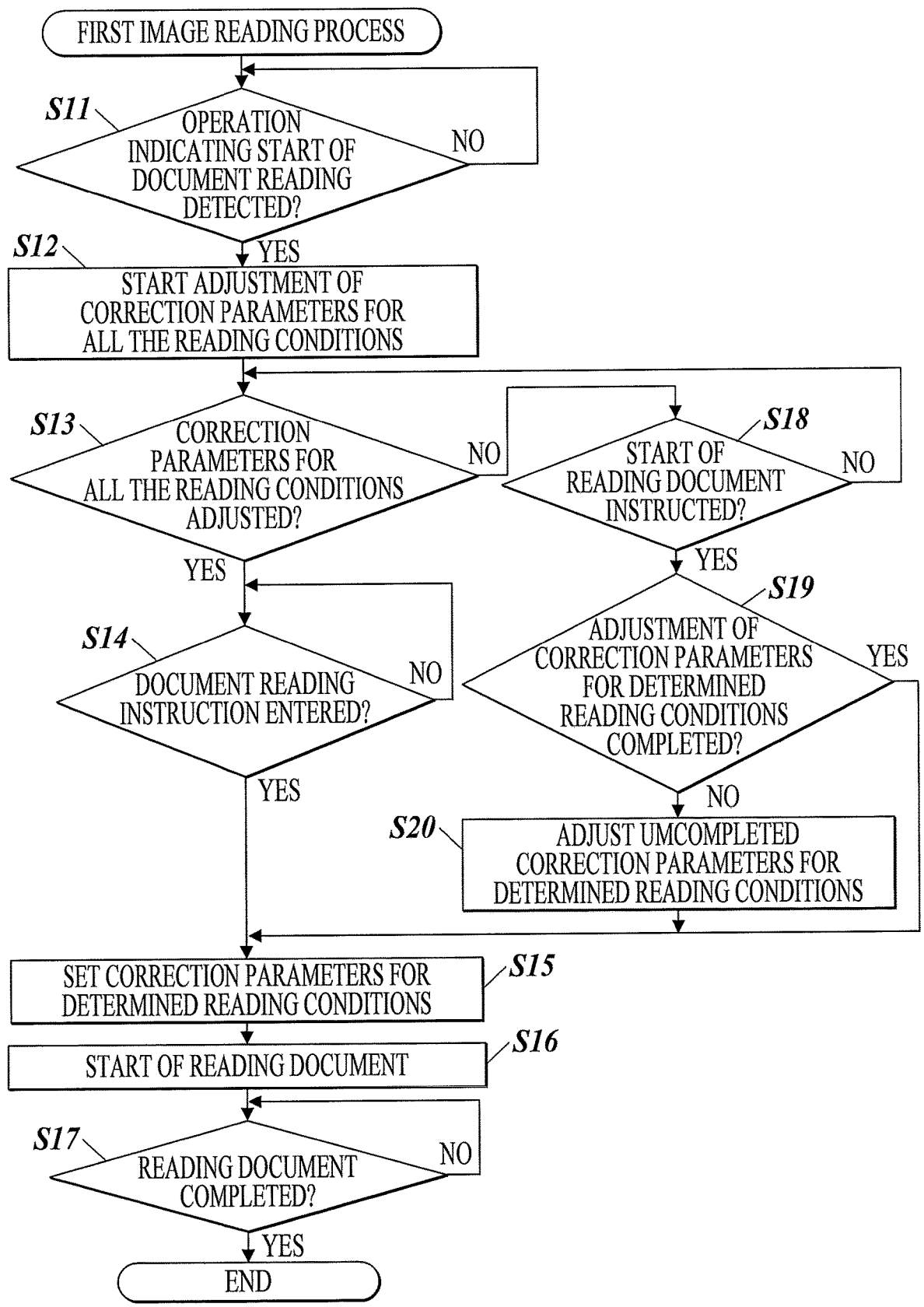
FIG. 3 is a flowchart of a first image reading process.
Figure 4:
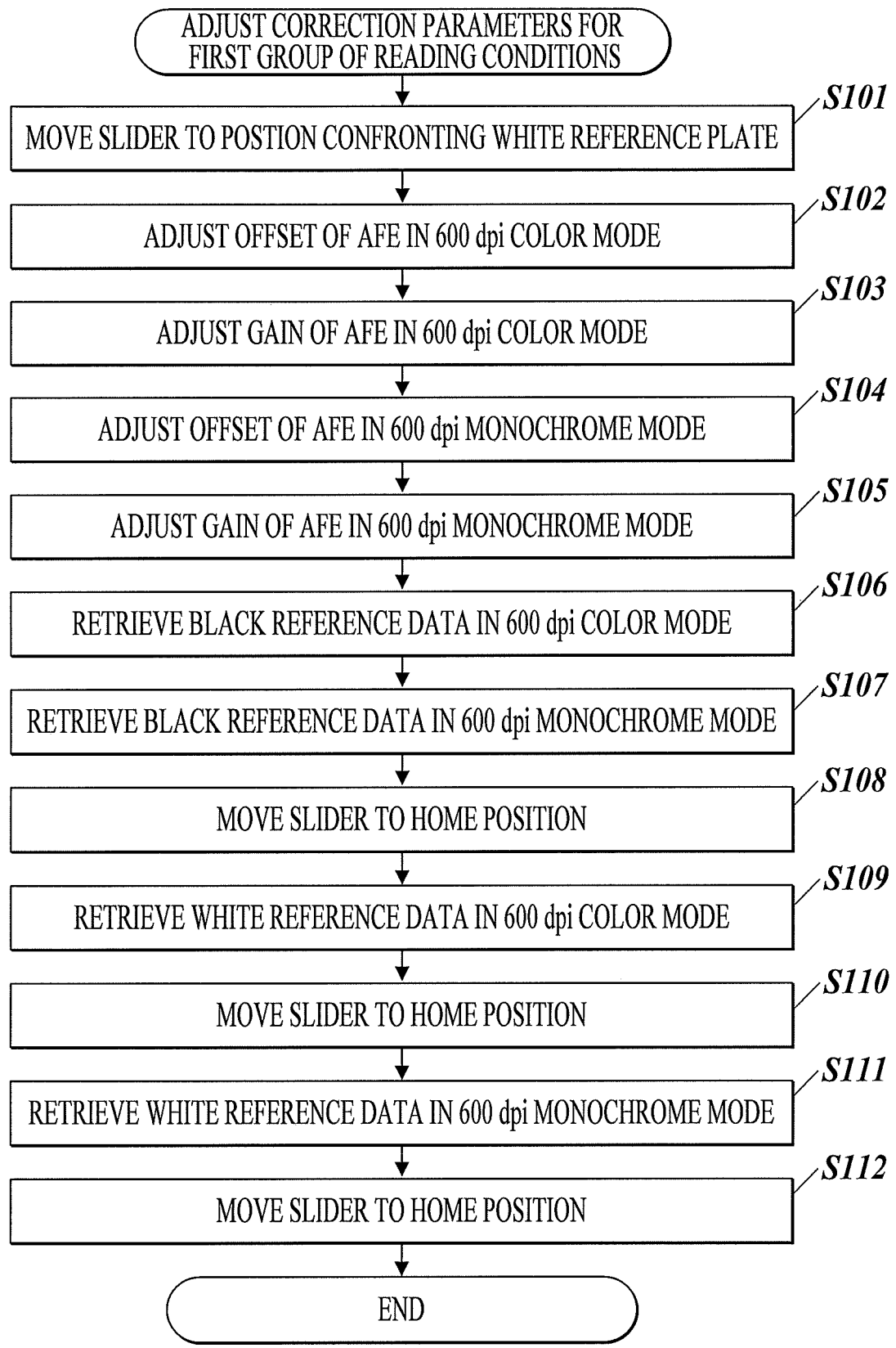
FIG. 4 is a flowchart of adjustments of correction parameters for a first group of reading conditions.
Figure 5:
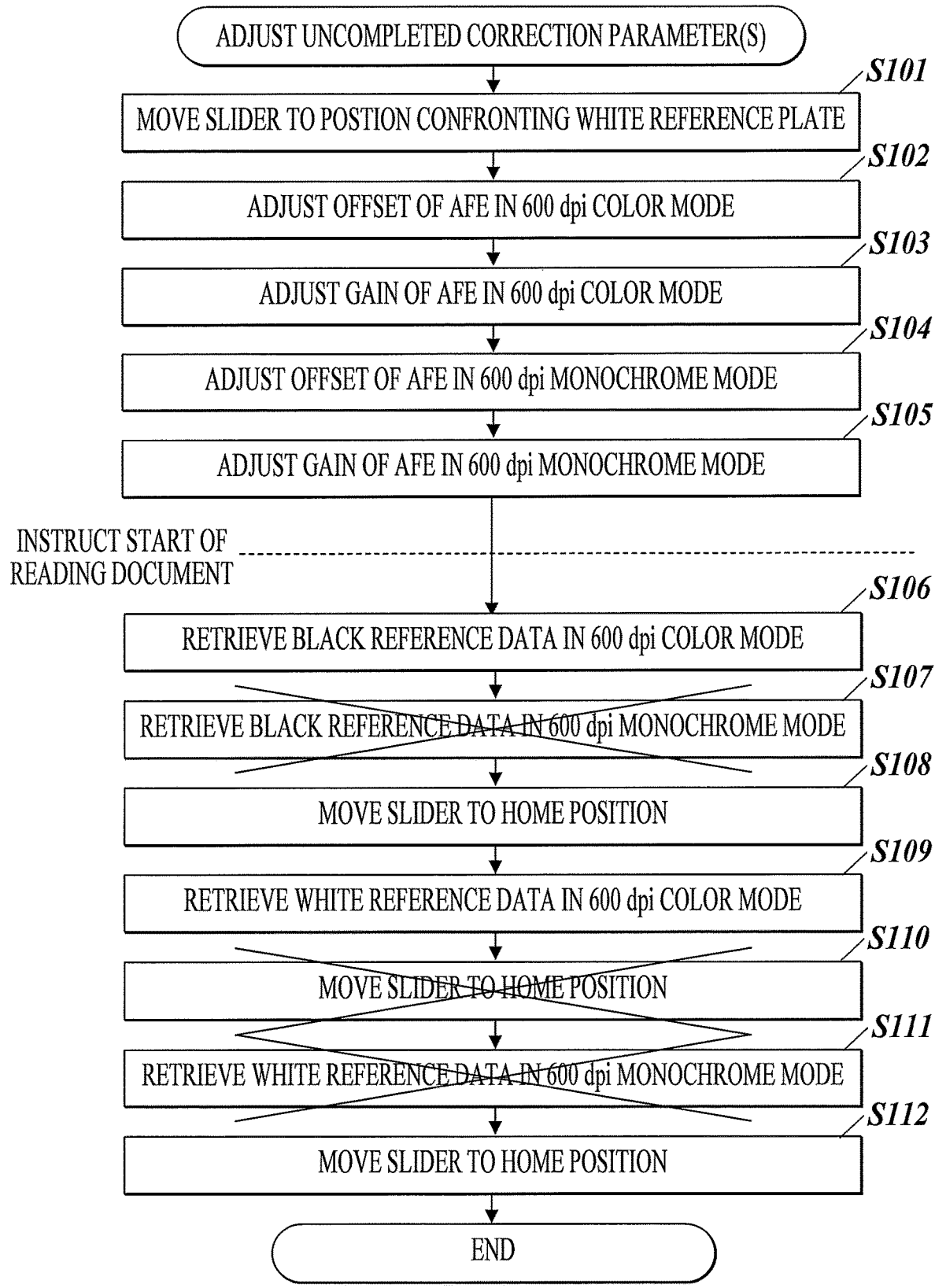
FIG. 5 is a flowchart illustrating exemplary adjustments of uncompleted correction parameters for determined reading conditions.

With reference to FIGS. 3 to 5, the operation of the image generating device 1 will now be explained. FIG. 3 is a flowchart of the first image reading process. FIG. 4 is a flowchart of the adjustment of correction parameters for a first group of reading conditions. FIG. 5 is a flowchart illustrating exemplary adjustments of uncompleted correction parameters for determined reading conditions.

The first image reading process in the operation of the image generating device 1 will be explained. The first image reading process involves reading of an image of the document by the image reader 2 and generation of the data of the image. For example, the turning on of the image generating device 1 triggers the hardware processor 100 to perform the first image reading process according to a first image reading program in the memory 3.

As illustrated in FIG. 3, the hardware processor 100 checks for detection of the operation indicating the start of document reading based on the information detected by the detector 120 (Step S11). The operation indicating the start of document reading includes the opening of the ADF 20 by a user, the placement of the document on the ADF 20 by the user, or the operation indicating the start of document reading in response to entry by the user on the operation display 7 with respect to reading of the document. The opening of the ADF 20 by the user is determined from the information sensed by the opening detector 16. The placement of the document on the ADF 20 by the user is determined from the information detected by the document detector 23. The operation indicating the start of document reading in response to entry by the user with respect to reading of the document is determined from entry on the operation display 7 with respect to the document reading.

If the operation indicating the start of document reading is not detected (Step S11; NO), the process goes to Step S11. If the detection of the operation indicating the start of document reading is detected (Step S11; YES), the hardware processor 100 operates the drive 130 and instructs the image reading component 106 to start the adjustments of correction parameters for the reading conditions (Step S12). Exemplary reading conditions include the reading mode (color or monochrome), the resolution of reading, and single-sided or double-sided image reading of the image of the document. The adjustment of correction parameter involves the retrieval of light intensity data and the calculation of a correction parameter based on the retrieved light intensity data.

With reference to FIG. 4, the adjustments of the correction parameters for the reading conditions in Step S12 are exemplified by the adjustments for the first group of reading conditions. The reading conditions in this context include, for example, the document reading in the color mode/monochrome mode, the resolution of 600 dpi (dots per inch), and the single-sided image reading.

As illustrated in FIG. 4, the hardware processor 100 drives the slider 14 to move together with the image sensor module 11 to face the white reference plate 12 (Step S101). The hardware processor 100 designates the mode of the AFE 112 to the 600 dpi color mode, turns off the LED 110 and retrieves the data of the light intensity detected at the white reference plate 12 in the OFF-state of the LED 110 by light receiver 111, from the AFE 112. The hardware processor 110 calculates the offset to be determined for the AFE 112 in order to adjust the gradation level of the retrieved image to a predetermined reference black level and stores the calculated offset in the RAM 102 (Step S102).

The hardware processor 100 turns on the LED 110 and retrieves the data of the light intensity detected at the white reference plate 12 in the ON-state of the LED 110 by the light receiver 111, from the AFE 112. The hardware processor 100 calculates the gain adjustment value to be determined for the AFE 112 in order to adjust the gradation level of the retrieved image to a predetermined reference white level and stores the calculated gain adjustment value in the RAM 102 (Step S103). The hardware processor 100 designates the mode of the AFE 112 to the 600 dpi monochrome mode. Like Step S102, the hardware processor 100 calculates the offset for the 600 dpi monochrome mode and store the offset in the RAM 102 (Step S104). Like Step S103, the hardware processor 100 calculates the gain adjustment value for the 600 dpi monochrome mode and store the calculated gain adjustment value in the RAM 102 (Step S105).

The hardware processor 100 designates the mode of the AFE 112 to the 600 dpi color mode and turns off the LED 110. The hardware processor 100 retrieves the data of the light intensity detected at the white reference plate 12 in the OFF-state of the LED 110 by the light receiver 111 ("black reference data") from the AFE 112 and stores the retrieved black reference data in the RAM 102 (Step S106). The hardware processor 100 designates the mode of the AFE 112 to the 600 dpi monochrome mode. Like Step S106, the hardware processor 100 retrieves the black reference data for the 600 dpi monochrome mode and stores the black reference data in the RAM 102 (Step S107).

The hardware processor 100 returns the slider 14 to the home position together with the image sensor module 11 (Step S108). The hardware processor 100 designates the mode of the AFE 112 to the 600 dpi color mode and turns on the LED 110 while driving the slider 14 to horizontally move with the image sensor module 11. The hardware processor 100 retrieves the average of the light intensities detected in multiple paths at the white reference plate 12 in the ON-state of the LED 110 by the light receiver 111 ("white reference data") from the AFE 112 and stores the retrieved white reference data in the RAM 102 (Step S109).

The hardware processor 100 drives the slider 14 to return to the home position with the image sensor module 11 (Step S110). The hardware processor 100 designates the mode of the AFE 112 to the 600 dpi monochrome mode. Like Step S109, the hardware processor 100 retrieves the white reference data in the 600 dpi monochrome mode and stores the white reference data in the RAM 102 (Step S111). The hardware processor 100 drives the slider 14 to return to the home position with the image sensor module 11 (Step S112), and the adjustments of the correction parameters for the first group of reading conditions are completed.

The completed adjustments of the correction parameters for the reading conditions result in retrieval of offsets, gain adjustment values, black reference data, and white reference data. The correction parameters are stored in the RAM 102. These correction parameters are transmitted to the image processor 108 for reading of the image. The level of light intensity in the digital image signal from AFE 112 is appropriately adjusted. The image processor 108 corrects the difference in levels of light intensities among pixels due to the unevenness of the light emitted from the LED 110 and the variation in the photoelectric conversion characteristics of the pixels in the light receiver 111.

The level of light intensity in the digital image signal from the AFE 112 may be tuned by adjustment of the correction parameters including not only the offset and the gain adjustment value but also the intensity of light emitted from the light source or the LED 110 (emission intensity).

Returning to FIG. 3, after Step S12, the hardware processor 100 checks for completion of the adjustments of the correction parameters for the reading conditions (Step S13). If the adjustments of the correction parameters for the reading conditions are completed (Step S13; YES), the hardware processor 100 checks for entry of the document reading instruction on the operation display 7 by a user or for reception of a request for the start of reading the document from an external device, such as a PC, via the communicator 6 (Step S14). The document reading instruction includes determined reading conditions for actual reading of the document.

If the document reading instruction is not entered (Step S14; NO), the process in Step S14 is repeated. If the document reading instruction is entered (Step S14; YES), the hardware processor 100 reads the correction parameter from the RAM 102 and transmits the correction parameter to the image processor 108 (Step S15). The hardware processor 100 operates the drive 130, controls the image reading component 106 according to the determined reading conditions and starts to read an image of the document placed on the document table 25 or the FB glass 15 (Step S16). To read the image of the document D placed on the document table 25 in Step S16, the hardware processor 100 drives the slider 14 to move with the image sensor module 11 to face the ADF window 13. The hardware processor 100 instructs the conveyor 24 to transfer the document D to the document discharger 26. The hardware processor 100 instructs the image reading component 106 to read the image on the document D. The hardware processor 100 stores the retrieved image data in the memory 3 or instructs the communicator 6 to transmit the image data to an external device in the communication network. In the case that the determined reading conditions include the double-sided image reading, the correction parameters related to the image sensor modules 11 and 21 are also adjusted. The adjusted correction parameters are then transmitted to the image processor 108. The image reading component 106 reads the images on the front and back sides of the document D.

To read the image of the document D placed on the FB glass 15 in Step S16, the hardware processor 100 drives the slider 14 to horizontally move along the FB glass 15. The hardware processor 100 instructs the image reading component 106 to read the image on the document. The hardware processor 100 stores the retrieved image data in the memory 3 or instructs the communicator 6 to transmit the image data to an external device in the communication network. In response to a copy instruction entered by the user on the operation display 7, the hardware processor 100 may instruct, for example, the sheet feeder 5 and the image generator 4 to generate an image on a sheet from the image data of the document after Step S16.

The hardware processor 100 determines whether the document reading in Step S16 has been completed (Step S17). If reading of the document in Step S16 is uncompleted (Step S17; NO), the process in Step S17 is repeated. If the document reading in Step S17 is completed (Step S17; YES), the first image reading process terminates.

If the adjustments of the correction parameters for the reading conditions are not completed (Step S13; NO), the hardware processor 100 repeats the same process as that in Step S14 and checks for entry of the document reading instruction (Step S18). If the document reading instruction is not entered (Step S18; NO), the process returns to Step S13. If the document reading instruction is entered (Step S18; YES), the hardware processor 100 determines whether the adjustments of the correction parameters for the determined reading conditions transmitted in Step S18 have been completed among all the reading conditions transmitted in Step S12 and beyond (Step S19).

If the adjustments of the correction parameters for the determined reading conditions are completed (Step S19; YES), the process goes to Step S15. If the adjustments of a correction parameter(s) for the determined reading conditions are not completed (Step S19; NO), the hardware processor 100 adjusts the uncompleted correction parameter for the determined reading condition determined in Step S18 among all the reading conditions in Step S12 and beyond (Step S20). The process then goes to Step S15.

With reference to FIG. 5, exemplary adjustments of uncompleted correction parameters for determined reading conditions in Steps S12, S18, and S19 will now be described. As illustrated in FIG. 5, the adjustment of the correction parameter for the reading condition starts in Step S12. Steps S101 to S105 are then performed and completed before entry of the document reading instruction in Step S18. Steps S106 to S112 are uncompleted. The document reading instruction in this context includes determined reading conditions of the 600 dpi color mode and the single-sided image reading.

Steps S101 to S103 corresponding to the determined reading conditions are completed. In Step S20, the hardware processor 100 can skip Steps S107 and S111 and Step S110 related to Steps S107 and S111 because these do not correspond to the determined reading conditions. The hardware processor 100 performs and completes only Steps S106, S108, S109, and S112 to skip part of the procedures after entry of the document reading instruction and determination of the reading condition. This process can reduce the time between entry of the document reading instruction and the start of reading the image on the document.

In accordance with the present embodiment, the image reader 2 of the image generating device 1 includes the image reading component 106 that reads an image on the document; and the hardware processor 100 that detects an operation indicating the start of document reading. If the operation indicating the start of document reading is detected, the hardware processor 100 starts to adjust the correction parameters for the reading conditions. The hardware processor 100 detects entry of a document reading instruction including a determined reading condition. If entry of the document reading instruction is detected and the reading condition is determined, the hardware processor 100 checks for completion of the adjustment of the correction parameter for the determined reading condition. In the case that the adjustment is completed, the hardware processor 100 instructs the image reading component 106 to read the image on the document using the correction parameter for the determined reading condition. If the adjustment is uncompleted, the hardware processor 100 adjusts an uncompleted correction parameter for the determined reading condition. The hardware processor instructs the image reading component 106 to read the image on the document using the correction parameter for the determined reading condition.

Before entry of the document reading instruction, the correction parameter corresponding to the determined reading condition can be preliminarily adjusted. Thus the time between entry of the document reading instruction and the start of reading the image on the document can be reduced.

The operation indicating the start of document reading is the placement of the document on the image reading component 106, the opening of the ADF 20, or entry on the operation display 7. The operation indicating the start of document reading can be certainly detected.

The reading condition is at least one of the color or monochrome mode, the resolution, and single-sided or double-sided image reading for reading of the image on the document. The correction parameter for an appropriate reading condition can be adjusted.

The correction parameter is at least one of the offset of the signal of the image read by the AFEs 112 and 212, the gain adjustment value, the white reference data, the black reference data, the emission intensity of the light source. An appropriate correction parameter can be adjusted.

Entry of the document reading instruction refers to entry of the document reading instruction on the operation display 7 and reception of the request for the start of reading the document from an external device via the communicator 6. Entry of the document reading instruction can be appropriately detected.

The image generating device 1 includes the image reader 2, the sheet feeder 5 that generates an image on a sheet from the data of the image read by the image reader 2, and the image generator 4. The time between the reception of the document reading instruction and the start of the document reading can be thereby reduced, resulting in a reduction in the time for copying of the document.

First Modification

Figure 6:
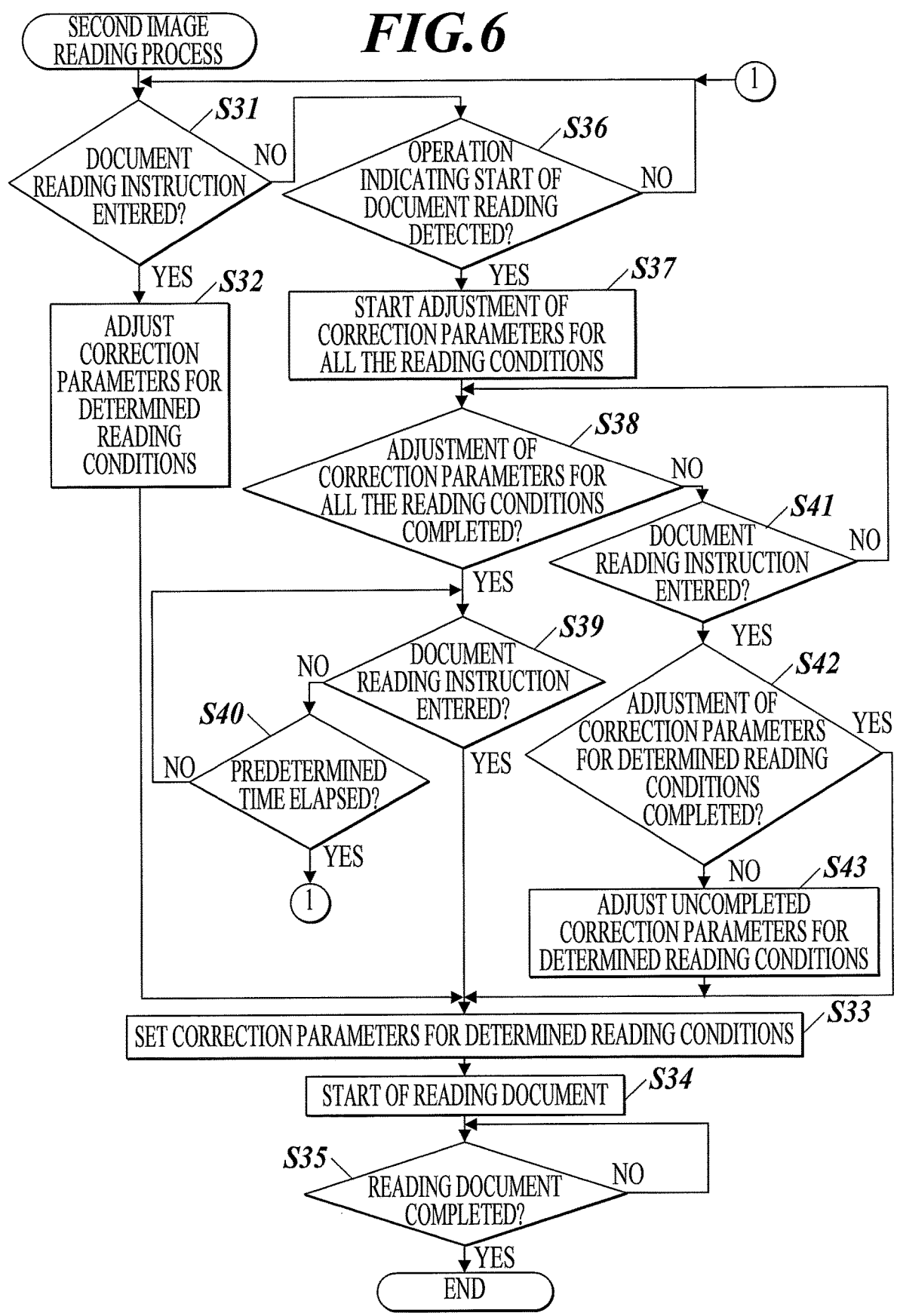
FIG. 6 is a flowchart of a second image reading process.

With reference to FIG. 6, a first modification of the present embodiment will now be described. FIG. 6 is a flowchart of a second image reading process.

This modification includes the image generating device 1 according to the present embodiment, with the proviso that the memory 3 stores not the first image reading program but a second image reading program performing a second image reading process, which will be described below.

With reference to FIG. 6, the operation of the image generating device 1 will now be explained. The second image reading process in the operation of the image generating device 1 will be explained. The second image reading process involves reading of the image on the document by the image reader 2 to retrieve data of the image without detection of the operation indicating the start of document reading in the case of probable reception of the document reading instruction. For example, the turning on of the image generating device 1 triggers the hardware processor 100 to perform the second image reading process according to the second image reading program in the memory 3.

As illustrated in FIG. 6, the hardware processor 100 performs Step S31 involving the same process as that of Step S14 in FIG. 3. If the document reading instruction is entered (Step S31; YES), the hardware processor 100 adjusts the correction parameter for the determined reading condition determined in Step S31 among all the reading conditions (Step S32). The hardware processor 100 performs Steps S33 to S35 involving the same processes as those of Steps S15 to S17 in FIG. 3.

If the document reading instruction is not entered (Step S31; YES), the hardware processor 100 performs Step S36 involving the same process as that of Step S11 in FIG. 3. If the operation indicating the start of document reading is not detected (Step S36; NO), the process returns to Step S31. If the operation indicating the start of document reading is detected (Step S36; YES), the hardware processor 100 performs Steps S37 to S39 involving the same processes as those of Steps S12 to S14 in FIG. 3.

If the document reading instruction is entered (Step S39; YES), the process goes to Step S33. If the document reading instruction is not entered (Step S39; NO), the hardware processor 100 checks for a predetermined elapsed time after the start of Step S39 (Step S40). If the predetermined time does not elapse (Step S40; NO), the process returns to Step S39. If the predetermined time elapses (Step S40; YES), the process returns to Step S31.

The correction parameters calculated immediately before reading of the image on the document should be used as much as possible because the light intensities of the LEDs 110 and 210 of the image sensor modules 11 and 21, the levels of output analog signals from the light receivers 111 and 211, and the A/D conversion characteristics of the AFEs 112 and 212 vary over the time due to the impact of, for example, heat. Hence, the correction parameters for reading of an image at an optimal light intensity level are also time-dependent. In the case of the predetermined elapsed time without reception of the document reading instruction after detection of the operation indicating the start of document reading and the subsequent completion of adjustments of the correction parameters for the reading conditions in Step S40, the correction parameters for the determined reading conditions or the reading conditions are readjusted in Step S32 or S37.

If the adjustments of correction parameters for the reading conditions are uncompleted (Step S38; NO), the hardware processor 100 performs Steps S41 to S43 involving the same processes as those of Steps S18 to S20 in FIG. 3.

In accordance with the present modification, if entry of the document reading instruction is detected without detection of operation indicating the start of document reading, the hardware processor 100 adjusts the correction parameters for the determined reading condition and completes the adjustment and subsequently instructs the image reading component 106 to read the image on the document using the adjusted correction parameters for the determined reading condition. Even in the case that entry of the document reading instruction is detected without detection of the operation indicating the start of document reading, the correction parameters for the determined reading conditions are adjusted without adjustments of the correction parameters for the reading conditions. Thus, the time between entry of the document reading instruction and the start of the document reading can be reduced.

After the completed adjustments of the correction parameters for the reading conditions, the hardware processor 100 checks for a predetermined elapsed time without entry of the document reading instruction. In the case of the predetermined elapsed time, the hardware processor 100 readjusts the correction parameters for the reading conditions. Even if the light intensities of the LEDs 110 and 210, the levels of output analog signals from the light receivers 111 and 211, and the A/D conversion characteristics of the AFEs 112 and 212 vary over the time due to the impact of, for example, heat, an appropriate correction parameter can be selected for reading of an image at an optimal light intensity level.

The hardware processor 100 adjusts the correction parameters for the determined reading condition that corresponds to a new document reading instruction detected after the predetermined elapsed time. The hardware processor 100 instructs the image reading component 106 to read the image on the document using the correction parameters for the determined reading condition. Even if the light intensities of the LEDs 110 and 210, the levels of output analog signals from the light receivers 111 and 211, and the A/D conversion characteristics of the AFEs 112 and 212 vary over the time, an appropriate parameter can be selected for reading of the image at an optimal light intensity level.

Second Modification

Figure 7:
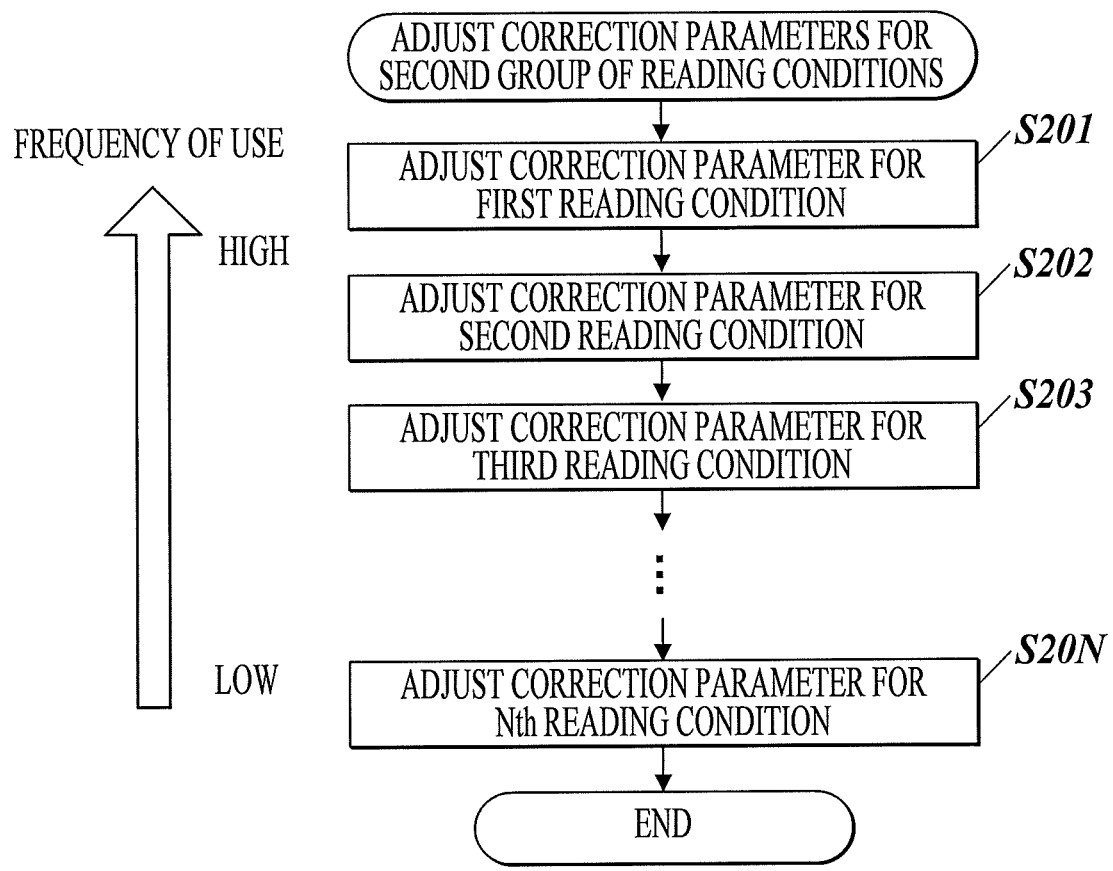
FIG. 7 is a flowchart of adjustments of correction parameters for a second group of reading conditions.

With reference to FIG. 7, a second modification of the present embodiment will now be described. FIG. 7 is a flowchart of the adjustments of correction parameters for a second group of reading conditions.

This modification includes the image generating device 1 according to the present embodiment. The image generating device 1 according to this modification performs the first image reading process of FIG. 3 with the proviso that the correction parameters to be adjusted in Step S12 are based not on the first group of reading conditions in FIG. 4 but on a second group of reading conditions in FIG. 7.

In the adjustments of the correction parameters in the first image reading process, the reading conditions are not determined at the start of the process. The correction parameters for the reading conditions with higher frequency of use are preferentially selected and adjusted. The adjustments of the correction parameters for specific reading conditions can be thereby completed at entry of the document reading instruction in Step S18, i.e., before the reading conditions are determined. Thus, reading of the document can be immediately started after entry of the document reading instruction.

As illustrated in FIG. 7, the frequency of use of each reading condition is preliminary measured for the adjustments of the correction parameters for the second group of reading conditions. Based on the results of the measurement, the correction parameters to be adjusted for the reading conditions are listed in the descending order of the frequency of use.

Specifically, the hardware processor 100 adjusts the correction parameter for a first reading condition (Step S201). The hardware processor 100 adjusts the correction parameter for a second reading condition (Step S202). The hardware processor 100 adjusts the correction parameter for a third reading condition (Step S203). In this manner, the hardware processor 100 adjusts the correction parameter for the $N^{th}$ (N is a positive integer) reading conditions (Step S20N) and terminates the adjustments of the correction parameters for the second group of reading conditions.

The correction parameters for the reading conditions are listed in the descending order of the frequency of use, i.e., Steps S201, S202, S203, . . . , and S20N in sequence. The adjustments of the correction parameters for the second group of reading conditions can further reduce the time for reading a document. The steps of adjusting the correction parameters for the second group of reading conditions involve retrieval of the light intensity data using a LED and calculation of the correction parameters based on the retrieved light intensity data.

In accordance with the second modification, the hardware processor 100 preferentially adjusts the correction parameter with high frequency of use among the correction parameters for all the reading conditions. Thus, the probability that the correction parameters with high frequency of use are preliminarily adjusted can be enhanced and the time between the transmission of the document reading instruction and the start of reading of the document can be reduced.

A default reading condition may be preset and the hardware processor 100 may preferentially adjust the correction parameter for this reading condition among all the reading conditions. Alternatively, the hardware processor 100 may preferentially adjust the correction parameter for the latest reading condition updated by the user entry or the operation indicating the start of document reading on the operation display 7. This scheme can further reduce the time between entry of the document reading instruction and the start of the document reading. In the case of the updated reading condition on the operation display 7 during the adjustments of the correction parameters of the reading conditions, the hardware processor 100 may dynamically vary the priority of the adjustment of the reading condition to preferentially adjust the correction parameter for the latest updated reading condition. This scheme can further reduce the time between entry of the document reading instruction and the start of the document reading.

In the above description, a computer readable recording medium storing the programs according to the present disclosure, such as a HDD or a semiconductor memory, is illustrated. The computer readable recording medium may be any other medium. Such media may include a portable recording medium, such as CD-ROM. The media also includes carrier waves providing the data of the program according to the present disclosure via a communication line.

The embodiment and modifications that have been described only illustrate a preferred image reading device, image generating device, and recording medium according to the present disclosure and may include any other modification.

For example, the image reader 2 is a component of the image generating device 1 in the present embodiment and the modifications. Alternatively, any other configuration may be employed. The image reader 2 may be an independent device including, for example, the memory 3, the communicator 6, and the operation display 7.

The detailed configurations and operations of the components in the image generating device 1 according to the embodiment may be modified as required without departing from the scope and spirit of the present disclosure.

Although embodiments of the present disclosure have been described and illustrated in detail, the disclosed embodiments are made for purposes of illustration and example only and not limitation. The scope of the present disclosure should be interpreted by terms of the appended claims.

The entire disclosure of Japanese patent Application No. 2018-046132, filed on Mar. 14, 2018, is incorporated herein by reference in its entirety.

What is claimed is:

1. An image reading device, comprising:
 an image reader that reads an image on a document; and
 a hardware processor, wherein:
  the hardware processor detects an operation indicating a start of a reading of the image on the document,
  the hardware processor (i) begins performing iterative adjustment of a plurality of correction parameters by retrieving light intensity data and calculating at least one of the correction parameters based on the retrieved light intensity data and on at least one of a plurality of reading conditions for the image reader, upon the operation indicating the start of the reading of the image being detected, and (ii) continues performing the iterative adjustment of the correction parameters, until the iterative adjustment is completed or the hardware processor detects entry of a document reading instruction,
  the hardware processor checks for completion of adjustment of one or more of the correction parameters for one or more determined reading conditions included in the document reading instruction, after the hardware processor detects the entry of the document reading instruction,
  if the adjustment of the one or more correction parameters is completed, the hardware processor instructs the image reader to read the image using the one or more correction parameters for the one or more determined reading conditions, and
  if the adjustment of the one or more correction parameters is not completed, the hardware processor performs adjustment of uncompleted correction parameter(s) and then instructs the image reader to read the image using the one or more correction parameters for the one or more determined reading conditions.

2. The image reading device according to claim 1, wherein the operation indicating the start of the reading of the image is placing the document on the image reader, opening a document feeder of the image reader, or entry of the document reading instruction to an operation interface.

3. The image reading device according to claim 1, wherein the plurality of reading conditions comprise a color or monochrome mode, a resolution for reading the image, and a single-sided or double-sided image reading of the document.

4. The image reading device according to claim 1, wherein the plurality of correction parameters comprise an offset of a signal of the read image, a gain adjustment value, an emission intensity of a light source, white reference data, and black reference data.

5. The image reading device according to claim 1, wherein the hardware processor preferentially performs the adjustment of the correction parameter for at least one of a frequently used reading condition, a preset default reading condition and a latest updated reading condition, among the plurality of reading conditions.

6. The image reading device according to claim 5, wherein the hardware processor (i) updates an order of the plurality of reading conditions in the iterative adjustment of the plurality of correction parameters to preferentially perform adjustment of the correction parameter for the latest updated reading condition and (ii) performs the adjustment of the correction parameter according to the updated order.

7. The image reading device according to claim 1, wherein, in a case where the document reading instruction is detected without detection of the operation indicating the start of the reading of the image, the hardware processor (i) performs the adjustment of the one or more correction parameters for the one or more determined reading conditions and (ii) instructs the image reader to read the image using the one or more correction parameters for the one or more determined reading conditions.

8. The image reading device according to claim 1, wherein the entry of the document reading instruction is entry of the document reading instruction on an operation interface or reception of a request for the start of the reading of the image from an external device via a communicator.

9. The image reading device according to claim 1, wherein:
 the hardware processor checks for a predetermined elapsed time without entry of the document reading instruction, after the completion of the iterative adjustment of the plurality of correction parameters,
 the hardware processor performs adjustment of the plurality of correction parameters again, after the predetermined elapsed time.

10. The image reading device according to claim 9, wherein, in a case where entry of a new document reading instruction is detected after the predetermined elapsed time, the hardware processor (i) performs adjustment of one or more correction parameters for one or more determined reading conditions included in the new document reading instruction and (ii) instructs the image reader to read the image on the document using the one or more correction parameters for the one or more determined reading conditions included in the new document reading instruction.

11. An image generating device, comprising:
 the image reading device according to claim 1; and
 an image generator that generates the image on a sheet based on data of the image on the document read by the image reading device.

12. A non-transitory, computer-readable recording medium storing a program that causes a computer to serve as:
 an image reader that reads an image on a document; and
 a hardware processor, wherein:
  the hardware processor detects an operation indicating a start of a reading of the image on the document,
  the hardware processor (i) begins performing iterative adjustment of a plurality of correction parameters by retrieving light intensity data and calculating at least one of the correction parameters based on the retrieved light intensity data and on at least one of a plurality of reading conditions for the image reader, upon the operation indicating the start of the reading of the image being detected, and (ii) continues performing the iterative adjustment of the correction parameters, until the iterative adjustment is completed or the hardware processor detects entry of a document reading instruction, the hardware processor checks for completion of adjustment of one or more of the correction parameters for one or more determined reading conditions included in the document reading instruction, after the hardware processor detects the entry of the document reading instruction, if the adjustment of the one or more correction parameters is completed, the hardware processor instructs the image reader to read the image using the one or more correction parameters for the one or more determined reading conditions, and if the adjustment of the one or more correction parameters is not completed, the hardware processor performs adjustment of uncompleted correction parameter(s) and then instructs the image reader to read the image using the one or more correction parameters for the one or more determined reading conditions.

* * * * *